Jan. 3, 1939. E. J. BYERLEIN ET AL 2,142,491
MOLDING MACHINE
Filed Nov. 22, 1937 6 Sheets-Sheet 1
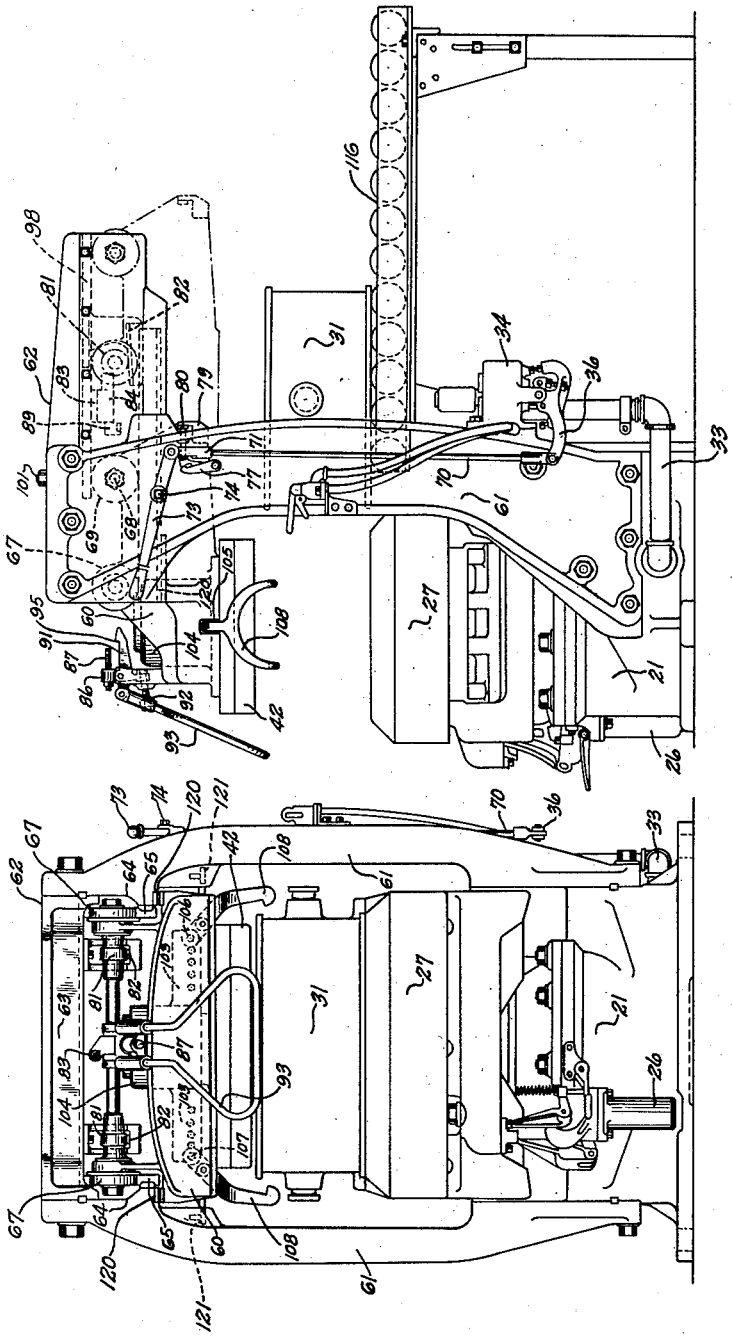
INVENTORS
Erle J. Byerlein &
BY Hardison E. Fellows,
Morsell, Lieber & Morsell
ATTORNEYS.

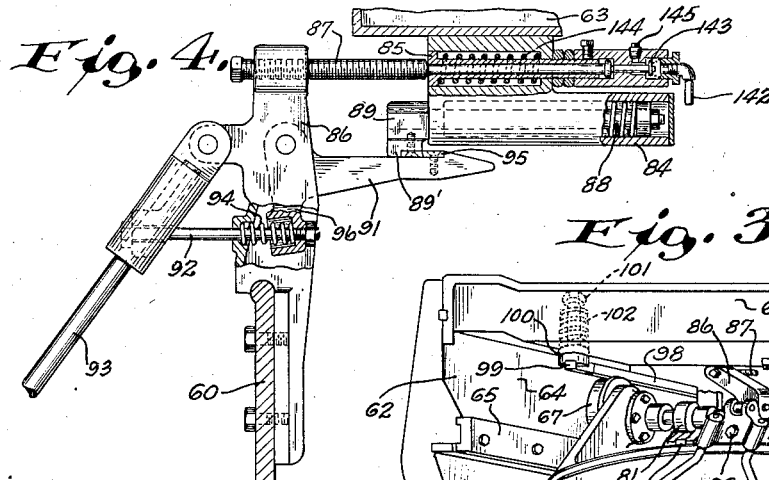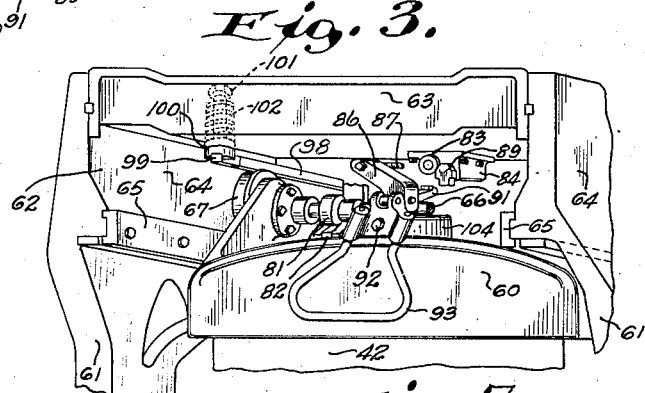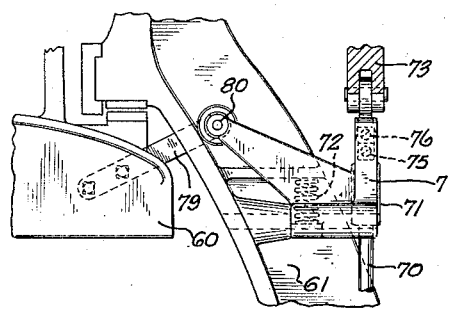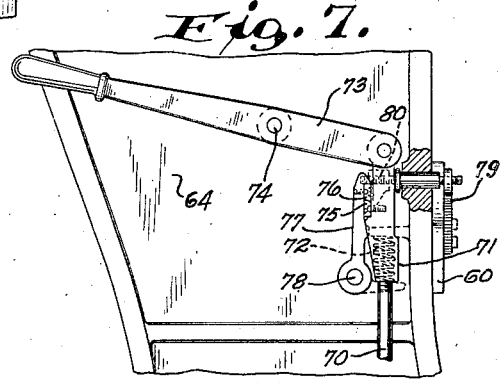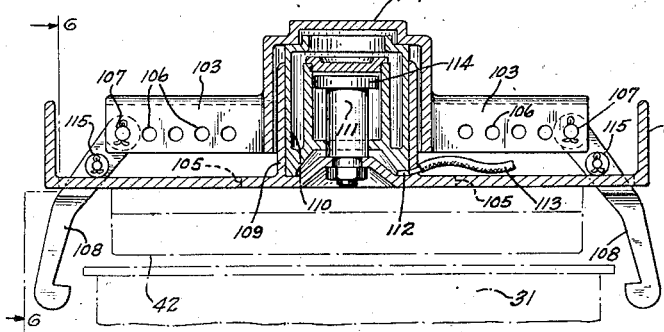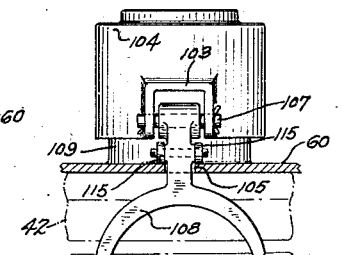

Jan. 3, 1939. E. J. BYERLEIN ET AL 2,142,491
MOLDING MACHINE
Filed Nov. 22, 1937 6 Sheets-Sheet 3
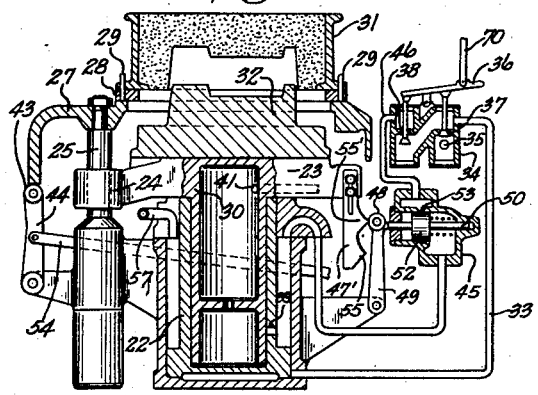
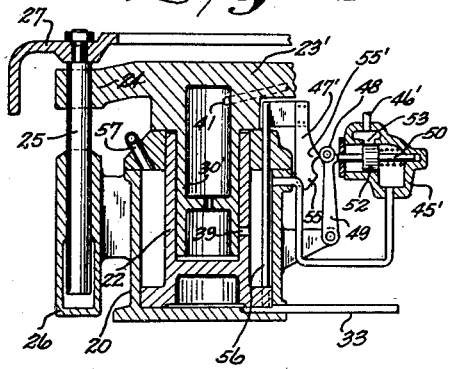
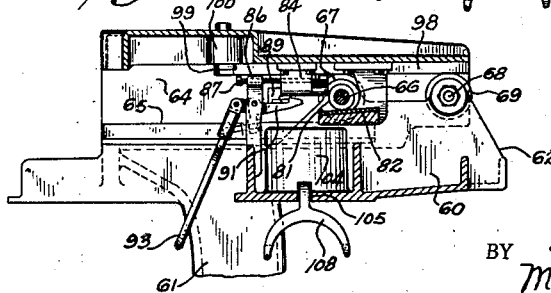
INVENTORS
Erle J. Byerlein &
Harrison E. Fellows,
BY Morsell, Lieber & Morsell
ATTORNEYS.

Jan. 3, 1939.　　　E. J. BYERLEIN ET AL　　　2,142,491
MOLDING MACHINE
Filed Nov. 22, 1937　　　6 Sheets-Sheet 4

INVENTORS
Erle J. Byerlein &
BY Harrison E. Fellows,
Morsell, Lieber & Morsell
ATTORNEYS.

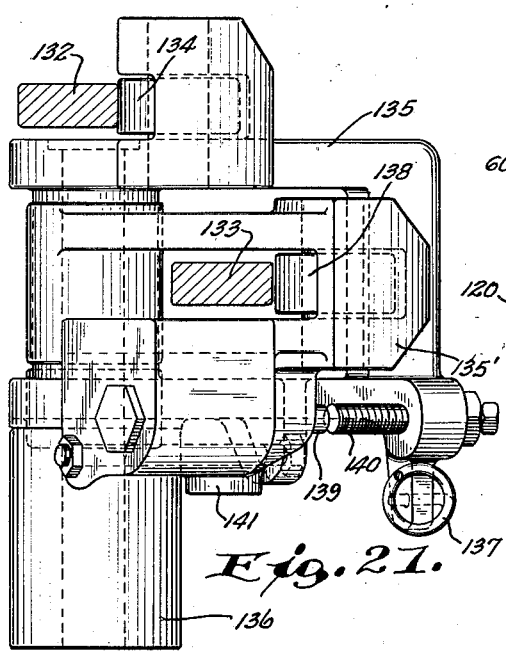
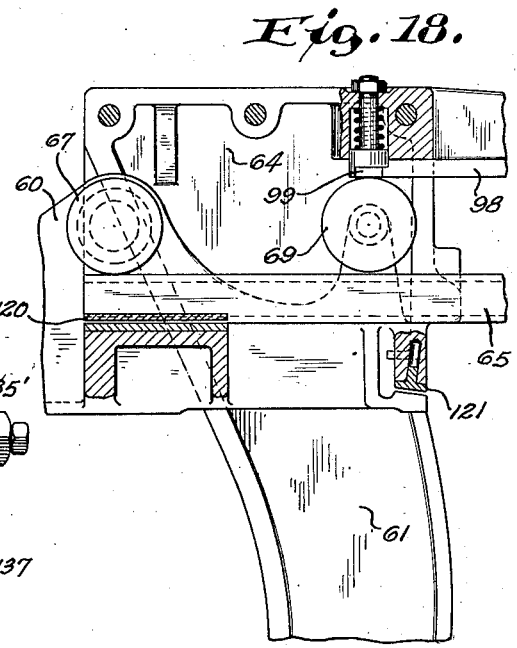
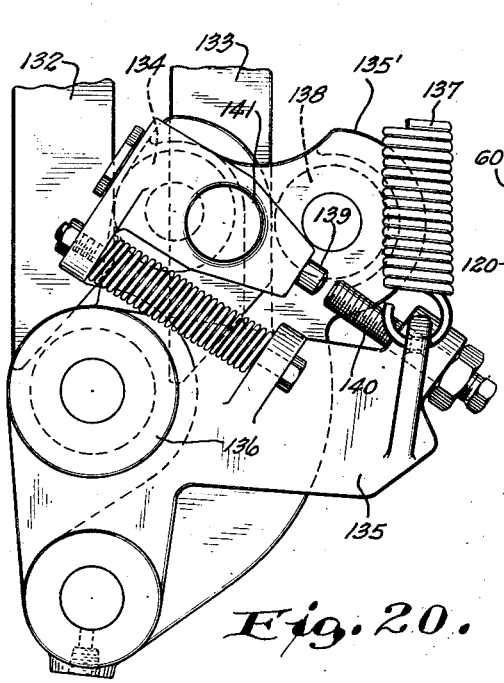
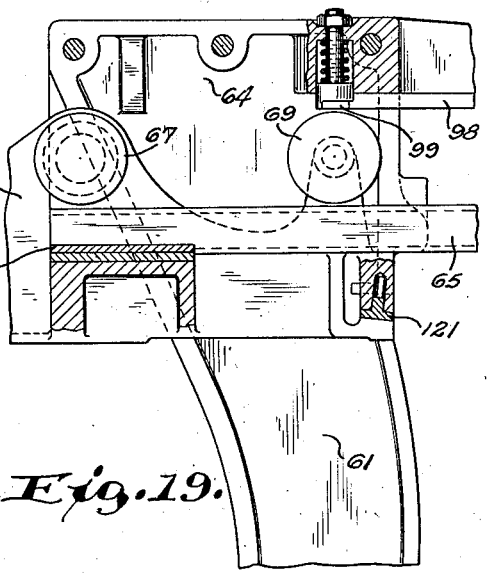

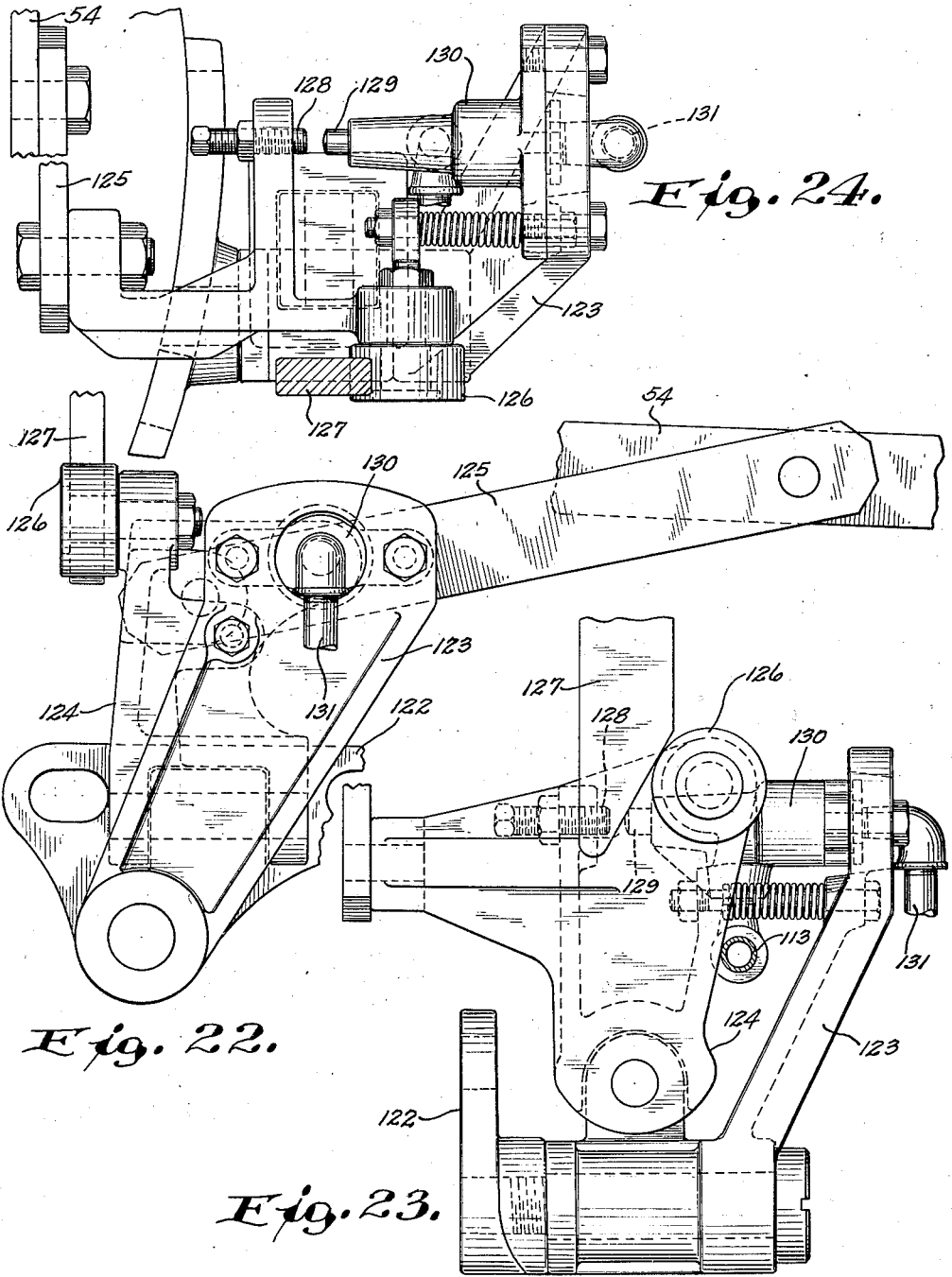

Patented Jan. 3, 1939

2,142,491

UNITED STATES PATENT OFFICE 2,142,491

MOLDING MACHINE

Erle J. Byerlein, Progreso, Tex., and Harrison E. Fellows, Wauwatosa, Wis., assignors to Milwaukee Foundry Equipment Company, Milwaukee, Wis., a corporation of Wisconsin Application November 22, 1937, Serial No. 175,834

19 Claims. (Cl. 22—26)

This invention relates to improvements in molding machines, and more particularly to a foundry molding machine adapted for jolting, squeezing, and stripping operations.

Molding machines of the type with which the present invention is concerned, are usually arranged to impart a rapid reciprocating movement to the molding flask to initially pack the molding sand around the pattern within the flask, after which the sand is subjected to a squeezing operation, followed by a dogging operation, during which operation the pattern is removed from the sand and flask. A fluid under pressure means is usually employed for reciprocating the various members of the molding machine for the above mentioned operations, and the squeezing or sand packing operation is effected against an elevated platen.

In certain types of molding machines, the platen is depended from an elevated car movable forwardly and rearwardly on tracks, the platen carrying car being arranged to be moved to a position over the molding flask for certain operations, and to be withdrawn therefrom for other operations. In the standard forms of molding machines having the car type platens, the weight of the platen car is borne by certain wheels which are engaged by suitably supported tracks. The jolting operations are performed when the car is withdrawn from or moved away from the mold, and it has been found that the jolting operation is apt to cause flat spots on the car wheels and depressions in the tracks with the result that when this condition obtains, difficulty will be encountered in effecting proper movement and travel of the car.

An object of the present invention is to overcome the above-mentioned difficulty by providing, in a molding machine with a car type platen, means for taking the weight of the car off of the normal wheels and tracks, when the car is in its withdrawn position for jolting operations, so that defects will not be formed in the wheels and tracks.

A further object of the invention is to provide, in a molding machine having a car type platen, auxiliary rearwardly inclined tracks for engaging the car in a certain position whereby the inclination of the tracks, with the provision of other means, serves to slow up the travel of the car when it is withdrawn, and to cushion it so as to minimize jars and bumps.

A further object of the invention is to provide, in a molding machine having a car type platen, auxiliary inclined tracks which receive the car in its rearward or withdrawn position, the inclination of said auxiliary tracks serving to give the car an initial desired forward momentum when the car is to be moved forwardly over the molding flask.

Another object of the invention is to provide, in a molding machine having a car type platen, flask engaging hook members depended from the car and operable after the pattern drawing operation, to engage the molding flask and elevate it and remove it from the molding portion of the machine, and as the platen car is moved rearwardly or withdrawn, the molding flask is carried therewith to a rear position, permitting it to be thereafter lowered on to a conveyor, and thereby saving one entire operation necessary during the use of ordinary molding machines.

A further object of the invention is to provide, in a molding machine, automatic means for preventing performance of the squeezing operation before the platen carrying car is in its proper forward position.

In the ordinary molding machines now in use, after the squeezing operation and just prior to the stripping or pattern drawing operation, both of the machine tables are elevated and ordinarily are lowered slowly to a point where the dogging instrumentalities come into action to hold the stripper frame while the table carrying the pattern plate is permitted to continue to lower. Occasionally, there is an undesirable shock when the stripper plate is engaged by the dogging instrumentalities, and this is objectionable because it may injure the sand mold. Also, ordinarily another shock occurs when the table piston reaches the bottom of its cylinder.

The present invention has as a further object, the overcoming of the above difficulties and provides a means of speeding up the travel of the members in their descent from the squeezing position to the stripping position, and only momentarily retards the movement at the point where the dogging instrumentalities come into play, and the action of these members is accomplished so that the normal contact of the same with the stripping plate is cushioned to prevent damage to the mold, and thereafter the speed of descent of the table and pattern plate supporting table is accelerated and finally quickly checked without jars or shocks just prior to the lowermost position of said members, with the result that production may be greatly accelerated with the advantage of accomplishing slow and careful pattern drawing.

A further object of the invention is to provide a molding machine wherein the speed of action of the cylinders and dogging instrumentalities can be automatically controlled and can be regulated to suit the nature of the pattern and of the molding sand.

A further object of the invention is to provide a foundry molding machine which is of very simple construction, is easily and rapidly operated, requires a minimum of control valves and mechanisms, is strong and durable, and is well adapted for the purposes described.

With the above and other objects in view, the invention consists of the improved molding machine, and its parts and combinations as set forth in the claims, and all equivalents thereof.

In the accompanying drawings in which the same reference characters indicate the same or equivalent parts in all of the views:

Fig. 1 is a front view of the improved molding machine;

Fig. 2 is a side view thereof;

Fig. 3 is a fragmentary, perspective view of the platen car support and associated mechanism showing cushioning and locking means on the car;

Fig. 4 is an enlarged, fragmentary, detail view, partly in section, of the mechanism in the car support, for cushioning the car as it is moved to its rearward or withdrawn position;

Fig. 5 is an enlarged front view, partly in section, of the platen car and showing the mechanism for operating the flask-engaging hooks;

Fig. 6 is a detail, sectional view taken on line 6—6 of Fig. 5;

Fig. 7 is a fragmentary, detail side view with the platen car in a forward position but with the valve operating lever engaged to prevent manipulation thereof;

Fig. 8 is a fragmentary, detail front view of the showing in Fig. 7;

Fig. 9 is a longitudinal sectional view through the platen car and supporting structure therefor, with the car in its forward position;

Fig. 10 is a view similar to Fig. 9 only with the car in its rear or withdrawn position;

Fig. 11 is a plan view of the platen car in its forward position, the associated supporting structure being shown in broken lines;

Figure 12:
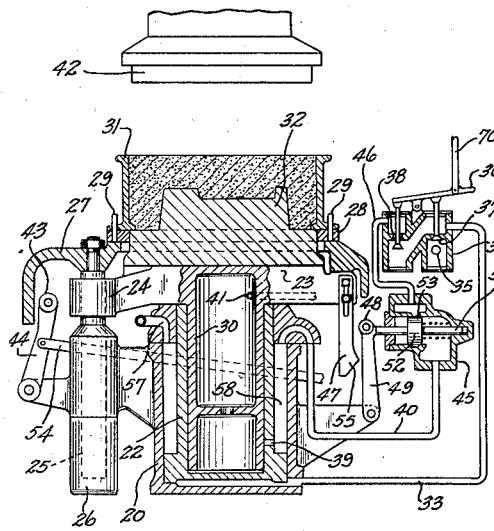

Figs. 12 to 15, both inclusive, are vertical sectional views, somewhat schematic, of the jolting, squeezing and stripping cylinders, pistons, tables and frames, and of the operating and fluid controlling valves, the various views showing different positions of the various member during the performance of different operations;

Figs. 16 and 17 are similar views of several slight modifications in the mechanism, particularly with reference to the control of the stripping operation and descent of the pistons;

Fig. 18 is an enlarged, fragmentary view, with parts broken away and in section, of the rear portion of the platen car and its supporting structure, said view illustrating the wheels engaged with the rails and the pressure pads out of contact;

Fig. 19 is a view similar to Fig. 18 only showing the wheels disengaged from the track and the pressure pads in mutual contact;

Fig. 20 is an enlarged, fragmentary, detail view of certain mechanism associated with the machine table and stripping frame whereby a valve operating mechanism may be actuated to automatically admit air into the lifting hooks cylinder;

Fig. 21 is a top view of the showing in Fig. 20 with certain parts in section;

Fig. 22 is an enlarged, fragmentary detail side view of another form of valve control mechanism for admitting air to the lifting hooks cylinder, said view also showing the connections which extend to the jolt table;

Fig. 23 is an end view of the showing in Fig. 22; and

Fig. 24 is a plan view of the showing in Fig. 23.

Referring to the drawings, and particularly to Figs. 12 to 17 inclusive, it will appear that a cylinder 20 is mounted within the base 21 (see Figs. 1 and 2) of the molding machine. The cylinder 20 is provided with a piston 22 which extends through the upper open end of the cylinder 20 and carries a jolt table or head 23 at its upper end. The head is of rectangular form and is provided with obliquely extending lugs 24 for slidingly receiving the upper portions of downwardly depending guide pins 25. Said guide pins 25 operate in guide cylinders 26 which are connected to the cylinder 20 and the frame 21 and are parallel to said cylinder. The guide cylinders also serve as dash pots and contain oil to cushion the downward movement of the guide pistons 25 and a stripping frame 27 which is secured to the upper ends of said pistons. A stripper plate 28 is secured to the stripper frame 27 while the head 23 is adapted to carry a pattern plate.

The major portion of the wall of the piston 22 is in spaced relation to the inner surface of the wall of the cylinder 20. The inner wall of the piston 22 serves as a cylinder for a piston 30 forming part of the head 23. The smaller piston functions to jolt the flask 31 to pack the sand therein on its exhaust stroke, and the larger piston serves to squeeze the sand around the pattern 32 and to strip the pattern from the sand. Air is supplied to the large cylinder 20 by a pipe 33 which is controlled by a valve 34, and air is also supplied into the piston 30 by a pipe 41, connected with a source of compressed air supply (not shown) and controlled by a suitable jolt valve (not shown). A portion of the pipe 41 may be flexible to permit movement of the piston. When air is admitted to the piston 30, it reacts so as to move the piston and table 23 carried thereby upwardly. The upward movement continues until a cylinder port 39 is uncovered, whereupon compressed air will escape or exhaust via a duct 57. Then, said piston will fall downwardly rapidly and the table 23 will strike the top of a cylinder head 20 whereby a severe jolt or jar is imparted to the table and members carried thereby. The jolting reciprocations can be continued as long as air is supplied through the pipe 41 and serves to preliminarily pack sand in the flask 31 about the pattern 32.

Following the jolting operations, sand is additionally compacted in the flask by a squeezing operation. For this operation, compressed air from the source enters a valve 34 through a conduit 35. When the free end of a valve handle 73 (Fig. 2) is pressed downwardly, a valve port 37 will be opened, permitting flow of air through the pipe 33, and by the same action of the valve handle, another valve port 38 will be closed. The air enters under piston 22 and both pistons, and all of the members carried thereby, are moved upwardly until the flask reaches a suitable platen 42 which has been moved over the base and cylinder. The air is kept on until the desired pressure has been built up under the piston 22 to properly squeeze the molding sand, this action being best shown in Fig. 13.

Heretofore, after the squeezing operation and during descent of the pistons and interception of the stripping frame by the dogging members, and final descent of the pistons, difficulties have been encountered. If the dogging members engage the stripping frame too forcefully, the mold may be jarred and damaged, and if the recession is too rapid after engagement of said dogging members suction will cause damage to the mold. It is, therefore, also desirable to immediately thereafter retard the descent of the pistons momentarily to effect a slow and careful pattern draw. Also it is undesirable to have the pistons strike the bottom of the cylinder 20 too forcefully. With the foregoing in mind, the present invention provides means for correctly meeting these contingencies and conditions. Consequently, in the present invention means are provided for reducing the time interval for the drop of the stripping frame 27 onto the rollers 43 of pivotal dogging arms 44 and to have the frame contact said rollers without a shock or bump; to commence drawing the pattern 32 from the molded sand in the flask 31 immediately thereafter and slowly at a desired speed to suit the nature of the pattern and sand; and to thereafter speed up the rate of descent of the members after pattern withdrawal is correctly under way; and finally to check and cushion the fall immediately before the piston 22 and the table 23 have reached their respective seats.

Figure 13:
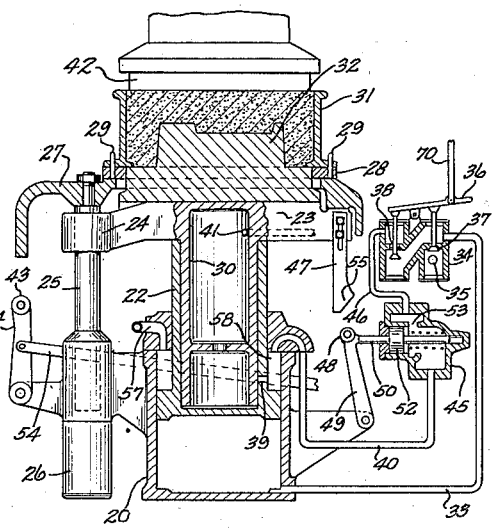
Figure 14:
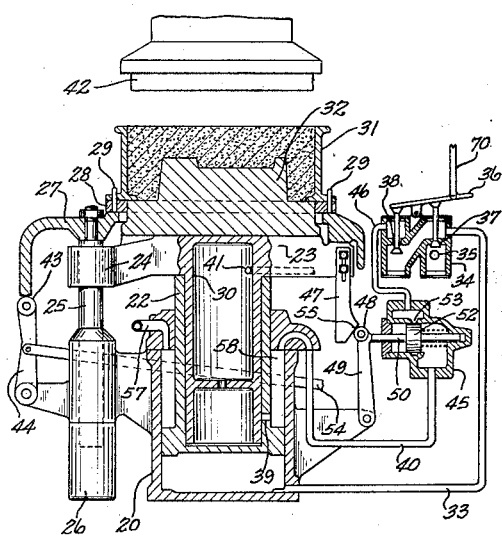
Figure 15:
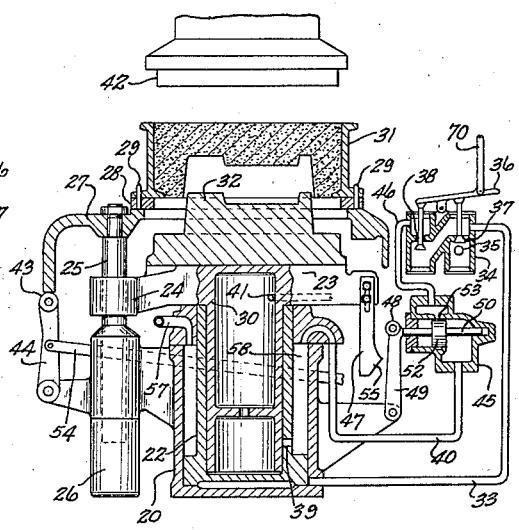

Referring again to Figs. 12 to 15 inclusive, it will be observed that in addition to the valve 34 there is an auxiliary valve 45. This valve does not function during jolting operations but comes into play after the squeezing operation for accomplishment of the purposes above mentioned. When the squeezing operation is completed, the valve handle 36 is released, closing port 37 and permitting air to exhaust from below the piston 22. The exhaust air flows through pipe 33 into the intermediate compartment of valve 34, through open valve port 38 and then into the casing of the auxiliary valve 45, via a connecting conduit 46. Obviously, the piston 22 will proceed to drop from its squeezing position and just before the stripping frame 27 makes contact with the rollers 43, a finger 47 adjustably depended from the lower portion of the head 23 will contact a roller 48 on the end of a pivotal arm 49, and said arm will be forced to the right in the drawings to actuate a valve plunger 50. The action which takes place is shown in Fig. 14 and it will be noted that the plunger 50, which is yieldably mounted, carries within the valve casing a valve 52 which is moved to close a port 53 preventing flow of air into the other side of said valve casing. It should be understood that after the squeezing operation the dogging arms 44 have been swung outwardly from the position of Fig. 12 to the position of Fig. 13 by the usual means which may include an operating bar 54. Because of the position of the valve 52 just effected, air will be trapped in the system below the piston 22 and the downward movement of said member will be checked and cushioned prior to the time that the stripping frame actually comes to rest on the rollers 43. Due to the adjustable mounting of the finger 47, it can be raised or lowered so as to regulate the point of operation of the valve plunger 50 and this is advantageous in adapting the machine for operation on various types of patterns and with various kinds of molding sand. Notwithstanding the closure of the valve port 53 by the valve 52, the piston 22 will nevertheless creep downwardly slowly because of air leakage around the valve plunger and other parts, and this creeping continues until the stripping frame actually gently settles on the rollers of the dogging arms 44. The speed at which the piston 22 creeps downwardly and the speed of pattern draw depends on the extent to which valve 52 closes port 53, and this is controlled by the adjusted length of plunger 50.

The dogging arms only intercept the stripping frame 27 and parts actually supported thereby for completion of the stripping or drawing operation. Hence, the slow descent of the table or head 23 continues and such movement is slow at the time the pattern is being withdrawn from the sand in the flask, which is highly desirable. During continued descent of the piston 22 and table 23, the roller 48 of the arm 49 rides upwardly on the inclined edge of a lug 55 on the finger 47 and eventually clears the lug and finger, as in Fig. 15. The lug 55 can be shaped and inclined as desired to suit any required condition as to speed of pattern withdrawal, acceleration, or the like. After there has been sufficient slow downward creeping of the piston and after the lug 55 has passed below the roller 48, the yieldable plunger 50 will automatically move to the left with respect to the drawings and the port 53 will be opened, speed of fall of the piston and table will be accelerated until said piston engages its seat in its lowermost position.

If it is desired to cushion the final seating of the piston, the finger 47' (see Figs. 16 and 17) may be formed with an additional lug or cam surface 55' which is engaged at the proper time by the roller 48 to again move the plunger 50 and close the valve port 53.

During normal jolting operations, it is not desirable for the finger 47 to engage and move the valve plunger 50. Hence, during these operations any suitable means may be provided for temporarily holding the plunger 50 inwardly in the Fig. 12 position. The roller 48 and finger 47 can be so spaced to prevent their contacting during jolting.

A slight additional modification is illustrated in Fig. 17. In this form of the invention, there is carried by the piston 22, through a vertical rod 56, a depending finger 47'. Said rod has its lower end threaded into the base flange of said piston and is vertically adjustable. With this construction, inasmuch as the piston 22 does not move during jolting operations, the finger 47' will not be moved and it will not be necessary to employ special means for holding the arm 49 away from said finger, as brought out in the preceding paragraph. In this case, during jolting, the upper cam or lug 55' on said finger will hold the valve plunger 50 inwardly to maintain the valve 52 in closed position. Escaping air from the jolting piston 30' escapes through ports 39 and thence to the atmosphere through duct 57.

In the present invention, exhaust air, which is clean, is utilized in the space above the flange portion of the piston 22 and said space is filled while said piston is falling and creating a suction therewithin. In Fig. 13 the piston 22 is in its uppermost position and after the sand in the flask 31 has been squeezed against the platen 42, air below the piston 22 is permitted to exhaust through the pipe 33, the intermediate chamber of the valve 34, through the connection 46, through the casing of the auxiliary valve 45, and then through the conduit 40 and finally into the chamber 58, the latter chamber being between spaced portions of the walls of the pistons 22 and walls of the cylinder 20. The air entering into this chamber can exert a force against the lower flange of the piston 22 to help to accelerate the fall of said piston. More important, however, this arrangement supplies clean air to the chamber 58 and this continues as the piston continues to fall, which would not be the case if exhaust air from below the piston 22 were conducted directly to the atmosphere, which is common practice. Any excess air in said chamber 58 is naturally expelled to the atmosphere through the duct 57. Or said air may be conducted to an air cleaner or breather, as desired.

It should also be observed that the air which is exhausted through the chambers, as described, is oil laden, and this helps to lubricate the sliding surfaces.

As will be clear from Figs. 1 and 2, the molding machine in general is of the type wherein the platen 42 is depended from the forward end portion of a slidable platen car 60. The base 21 of the machine has on opposite sides thereof upwardly extending arms or supports 61 which carry a platen car housing 62 or the bar structure. In general, said housing includes a top 63 and vertical spaced sides 64, the inner faces of said sides carrying tracks or rails 65 and 98 along which the platen car 60 is normally movable. As will appear from Fig. 11, a transverse shaft 66 journaled through the sides of the platen car carries a pair of spaced forward wheels 67, while stub shafts 68 carry rear wheels 69. During the major portion of forward and rearward propulsion of the platen car, said wheels 67 ride on the housing rails 65 and the wheels 69 ride against upper rails 98, as the center of gravity of the car is forwardly of the front wheel axes.

When squeezing operations are to be performed, as described heretofore, the platen 42 must be in position over the cylinders and table. Hence, at this time, the platen carrying car 60 should be in its forward position relative to its housing. One of the objects of the present invention is the inclusion of means in the improved molding machine to prevent performance of the squeezing operations until and unless the platen carrying car is in its forward position with the platen correctly disposed for these operations. To this end, the operating lever 36 of the squeezing valve 34 (shown schematically in Figs. 12 to 16 inclusive), is equipped with an extension rod 70. The upper end portion of said rod extends slidably through a box-like casing 71 and is normally urged downwardly by a confined coiled spring 72. The upper extremity of said rod has pivoted thereto the inner end portion of a control lever 73. Said lever 73 is intermediately pivotally mounted on a boss on the housing side 64, as at 74.

By reference particularly to Figs. 7 and 8, it will appear that a side of the upper portion of the rod 70 carries a block 75 adapted, under certain conditions, to have its top edge engaged under a lug 76 on the free end of a dog 77 which is pivotally mounted on the frame, as at 78. Normally, to operate the squeezing valve of the molding machine, to which the rod 70 extends, the free end of the lever 73 should be pressed downwardly to raise the other end of the lever and the rod 70 to which it is attached, and this operation will operate the valve 34 to close port 37 and open port 38. However, when the platen car 60 is in any position except its extreme forward position for squeezing, the arrangement is as illustrated in Fig. 7 and the dog 77 locks the rod 70 and prevents movement of the lever 73 and consequent operation of the squeezing valve.

When the platen car is, however, moved to its extreme forward position for squeezing, a rear lateral flange or plate 79 on the car engages a slidable plunger 80 and causes its end portion to move and engage the dog 77 to swing the dog to a rod releasing position. Thereupon the handle 73 is free to be moved to operate the squeezing valve.

In a molding machine having a platen car, when jolting operations are performed, the platen car is in its rearward or withdrawn position. Without the feature to be described, and according to standard practice, when this is the condition, the weight of the car and platen is borne directly by the car wheels and the rails on which said wheels ride. This is objectionable because the rails and wheels must be maintained in proper condition to insure free travel of the car, but due to the shocks of jolting operations, in time "flats" will be formed on the wheels, and depressions or irregularities will be formed in the rails.

The above objections are overcome in the present invention wherein the front axle 66 of the platen car has fast thereon a pair of auxiliary wheels 81 of less diameter than the wheels 67. Mounted on the lower portion of the rear of the housing 62 and alined with the wheels 81 are a pair of inclined stub rails 82 which are upwardly, rearwardly inclined. The result is that when the platen car is pushed sufficiently rearwardly the auxiliary wheels 81 will engage and ride upwardly on the stub rails 82. This will remove the front wheels 67 from the main rails 65 and the rear wheels 69 from rails 98, bringing the wheels 69 into contact with the rear end of rails 65, and the car will be supported by the wheels 81 on the stub rails 82. This is the proper position for the platen car during jolting operations and hence the usual wheels and rails will not be engaged and subjected to bumping and jolting actions such as would form defects therein.

As the platen car is usually pushed rearwardly with some force, means are provided for cushioning it as it reaches its rearward position for also releasably holding it in said rearward position on the inclined stub rails 82. The under surface of the top 63 of the car housing, intermediate the sides and just forwardly of the stub rails 82, carries a pair of adjacent cylinders 83 and 84. The uppermost cylinder 83 has a spring surrounded plunger 85 therein, which projects out of the forward end of said cylinder. An upper medial portion of the platen car 60 carries an upstanding bracket 86 in the end of which is adjustably threaded a rearwardly projecting pin 87. With this arrangement, when the platen car reaches its rearward position, the end of the pin 87 engages the resilient plunger 85 and due to the yielding movement of the plunger, there is a cushioning or shock absorbing effect.

The lower cylinder 84 also has extending longitudinally therein a spring surrounded yieldingly movable plunger 88. The forward end of said plunger, outwardly of said cylinder, carries a cap 89 having a projecting lower lug 89'. A pawl 91 is pivotally mounted on the car bracket 86 and a cupped arm 96 of said pawl has a slidable rod 92 extended therethrough, one end portion of said rod being secured to a pivotal operating or latch handle 93. When said pawl pivots in one direction, it compresses a confined coiled spring 94 on the rod 92. The outer free end of the pawl is provided with a shoulder 95.

When the platen car is pushed rearwardly, as previously mentioned, in addition to the cushioning effect afforded by the cylinder 83, the yieldable pivotal mounting of the pawl 91 is such that the pawl slides under the lug 89' of the plunger cap 88. Then, upon a slight forward rebound of the car, the shouldered end 95 of the pawl engages the cap lug 89', as in Fig. 4. Due to the yieldability of the plunger 88 which carries the cap 89, slight recoil is permitted, but the engagement shown in Fig. 4 is effective to maintain the platen car in its rear position wherein the auxiliary wheels 81 are engaged on the stub rails 82. When the platen car is to be moved forward, the operator first lifts upwardly on the latch handle 93. This action, through the rod 92, will rock the pivotal pawl in a direction to disengage it from the plunger cap 89, whereupon the car is free to be moved forwardly, and the inclination of the stub rails 82 plus the built-up spring tension on member 85 will give the car an initial desired forward impetus.

With reference to Figs. 18 and 19, the platen car 60 is illustrated in its forward position in Fig. 18 with the wheels 67 in contact with the rails 65 and the wheels 69 in contact with the upper rail 98 and registering with the yieldable section 99. The center of gravity of the car is forwardly of the axis of the wheels 67 with the result that in this position the car hangs in a slightly inclined position, permitting clearance at certain forward bearing pads 120 and rear striking pads 121. As pressure is applied to the center line of the platen, forwardly of the front axle, the front wheels 67 are lifted from track 65 until the bearing pads 120 engage. At this time, the platen car will rock and the rear striking pads 121 engage the heels of the frame 64. Fig. 19 illustrates attainment of the last-mentioned condition. If, through inadvertence, the squeezing pressure should react on the platen car rearwardly of the front wheel axis, the rear striking pads 121 will not contact the frame heels, and in this event, upward forces will be against wheels 69 at the time when the same are in engagement with the yieldable track section 99. The yieldability of said track section then relieves the wheel bearings of excessive pressure. This upward movement is, of course, limited, inasmuch as the front bearing pads 120 will limit the movement and will take most of the squeezing pressures. With the arrangements just described, there is a minimum of clearance at the bearing pads for the free movement of the platen car, but at the same time it prevents squeezing pressures being exerted against the bearings of the wheels 67 or 69.

Figs. 3, 10, 18 and 19 disclose the rails within the rear upper side portions of the platen car housing 63, previously referred to. The upper rails 98 and the sections 99 thereof are yieldingly mounted in slotted bosses 100. The yielding rail sections are depended from vertically movable rods 101, and said rods are movable against the tension of confined coiled springs 102. These yielding upper rail sections 99 are only engaged by the upper portions of the rear wheels 69 of the platen car when the car is in its forward position for squeezing operations.

After the pattern drawing operation, the flask with the mold therein is to be removed from the supporting member on the machine base, so that another flask may be quickly substituted for continued operations. At this stage, which follows the squeezing operation, the platen car is in its forward position. The top forward portion of the platen car has transverse apertured supporting channels 103 connected to and extending on opposite sides of a bell casing 104 and above transverse slotted openings 105. In a selected registering opening 106, of each of the channels, there is a pin 107 from which pivotally depends a flask hook 108, said hooks extending through and being movable in the slotted openings 105.

From Fig. 5, it will appear that the top of the platen car has formed thereon a cylinder 109 in which is slidably fitted a piston 110. The upper end of the piston supports the bell casing 104 which also encloses the cylinder and piston. The piston is vertically slidable within the cylinder, and upon a central stud 111. The lower portion of the cylinder has an air port 112 from which extends a hose 113. Said hose may be connected with a suitable source of supply of compressed air (not shown) and flow of air through the hose is automatically controlled by a valve during the final downward motion of the jolt table, when the pattern is drawn. When air is admitted into the cylinder 109 below the piston 110, said piston is raised, elevating with it the bell casing 104 and the hook carrying channels 103. The limit of upward movement of the piston is controlled by a head 114 on said guide stud 111.

When the piston in said cylinder is elevated through compressed air means, the hooks 108 will swing toward each other, riding on rollers 115. The platen car is so located relative to the flask 31 that this movement of the hooks 108 will cause the lower ends of the same to engage under the upper peripheral flange of the flask. Further upward movement of the portion 110 lifts the mold off of the flask supporting table so that the dogging arms 44 can be immediately tripped to return the stripping frame 27 to normal position. Simultaneously, the platen car is moved rearwardly in readiness for the jolting operation relative to a new flask and by virtue of the rearward movement of the platen car, the first flask with the finished mold therein is carried by the hooks to a position over a conveyor 116 at the rear of the machine. At this time, by exhausting the air from below the piston 110, said piston and bell casing will lower, and the hooks 108 will spread and disengage the flask.

The means for automatically operating the hooks 108 is best shown in Figs. 22, 23 and 24, said means including an automatic valve operating mechanism which controls the flow of air relative to the lifting hooks cylinder 109. The mechanism now referred to is attached to the main base of the machine by a bracket 122 to which is pivotally secured a valve supporting bracket 123, the latter bracket carrying a roller bracket 124 and roller, adapted to pivot in the opposite direction. The bracket 123 is connected to the dogging arms link 54 by means of a link 125.

During jolting operations, the dogging arms 44 (Figs. 12–16) are in their inner positions and hold a roller 126 out of engagement with a finger 127, said finger being depended from the jolt table 23. Hence the valve does not operate during the jolting operations. During squeezing operations, the dogging arms 44 move outwardly, transmitting motion through link 54 (Figs. 12–15) and link 125, to bring the roller 126 into alinement with said finger 127. Prior to the jolt table reaching its seat and just before the stripping frame engages the dogging arms and during a pattern drawing operation, said finger 127 contacts said roller 126 and forces a set screw 128 to engage and push a yieldable stem 129, said stem controlling a valve in a casing 130 whereby compressed air, admitted into the valve casing 130 through a connection 131, may pass from the valve casing through the connection 113 to the lifting hooks cylinder 109. By vertical adjustments of the finger 127 and adjustments of the set screw 128, the discharge of air via connection 113 to the lifting hooks cylinder can be regulated to suit the particular pattern and flask.

In Figs. 20 and 21 there is illustrated another arrangement for controlling air flow to the lifting hooks cylinder 109. This arrangement utilizes a pair of cam fingers 132 and 133, the first of which is attached to the machine stripper frame 27 and the other of which is attached to the jolt table 23 of the machine. During the jolting operation, the stripper frame cam finger 132 contacts a roller 134 on the main support 135, which support is pivotally mounted on a bracket 136 attached to the base of the molding machine. The engagement of said cam finger with said roller serves to hold the entire mechanism out of engagement with the jolt table cam finger 133. The cam roller 134 is urged toward said finger 132 by a spring 137. When the tables of the molding machine move upwardly for a squeezing operation, the spring tension causes the bracket 135 to be held in a position of alinement with the cam finger 132 and during this operation said cam finger is in a raised position by virtue of the dogging arms 44 which are in a position to support the stripping frame. The jolt table cam finger 133, in this situation, engages another roller 138 which is supported by the valve bracket 135'. Said engagement causes a valve stem 139 to be engaged and yieldably moved by a set screw 140, said valve stem operating mechanism within a valve casing 141 to permit air flow through the casing. The spring 137 maintains the bracket 135 in a suitable position so that the set screw 140 will effect the engagement just described. Air is admitted under pressure into the casing 141 by a suitable connection (not shown) and air leaves the other side of the casing through another connection and is conducted to the lifting hooks cylinder by the connection 113 (Fig. 5). In this arrangement, the finger 133 is likewise susceptible of vertical adjustments and the set screw 140 is also adjustable to admit air to the lifting hooks cylinder in a manner to suit the particular pattern and flask.

Air is exhausted from the lifting hooks cylinder 109 through a tubular connection 142 (Fig. 4) which enters the rear of the bore of the plunger 85. When the platen car is pushed to its rearward position, the adjustment screw 87 contacts the plunger 85 and this causes an opening of an exhaust valve 143. Movement of the plunger 85 is ultimately yieldingly repelled by a coiled spring 144 surrounding said plunger. The rate at which air is exhausted from below the piston 110 (Fig. 5), in order that the mold may be gently deposited upon a storage conveyor, is controlled either by an adjustable member in a plug as at 145 in Fig. 4 or by having a vent in said plug of a suitable diameter.

When the mold is depended by the hooks 108, the operator pushes the car rearwardly and trips the dogging arms 44. Thereupon the intake valve and the exhaust valves of the mechanism operate simultaneously. If the dogging arms 44 should be tripped before the car reaches its rear position, the molds will nevertheless hang from the hooks 108 as there is sufficient air trapped below the piston 110 to support the load.

Obviously, by shifting the hook depending pins 107 to any selected apertures in the channels 103, the hooks may be adjusted for flasks of varying sizes.

From the foregoing description it will be seen that the improved foundry molding machine is efficient in its operation, is novel, and is well adapted for the purposes described.

What is claimed as the invention is:—

1. In a molding machine having jointly and severally reciprocable pistons and supporting members carried thereby for the performance of squeezing and pattern drawing operations, means for lowering said pistons and members from squeezing position, means for intercepting one of said supporting members during the lowering of the pistons for pattern drawing, and means adjustably and interchangeably associated with one of the supporting members for retarding the speed of descent of said pistons at a selected point prior to the operation of said intercepting means and for accelerating the speed of descent of said pistons at a selected point after the pattern drawing is under way and for finally retarding the descent of said pistons and cushioning the seating of the same as they approach their lowermost positions.

2. In a molding machine having jointly and severally reciprocable pistons and supporting members carried thereby for the performance of squeezing and pattern drawing operations, means for lowering said pistons and members from squeezing position, means for intercepting one of said supporting members during the lowering of the pistons for pattern drawing, and automatically operating, regulatable valve controlled, fluid pressure means adjustably and interchangeably associated with one of the supporting members for retarding the speed of descent of said pistons at a selected point prior to the operation of said intercepting means and for accelerating the speed of descent of said pistons at a selected point after the pattern drawing is under way and for finally retarding the descent of said pistons and cushioning the seating of the same as they approach their lowermost positions.

3. In a molding machine, reciprocable members for supporting and moving a molding flask, a platen adjacent which the flask is adapted to be moved, a movable car on which said platen is mounted whereby the platen may be positioned over the flask for squeezing or withdrawn therefrom, valve controlled fluid pressure means for moving said reciprocable members, and means for preventing operation of said valve except when the platen carrying car is in position with the platen directly alined with the flask.

4. In a molding machine, reciprocable members for supporting and moving a molding flask, a platen adjacent which the flask is adapted to be moved, a movable car on which said platen is mounted whereby the platen may be positioned over the flask for squeezing or withdrawn therefrom, valve controlled fluid pressure means for moving said reciprocable members, and automatically operated means for preventing operation of said valve except when the platen carrying car is in position with the platen directly alined with the flask.

5. In a molding machine, reciprocable members for supporting and moving a molding flask, a platen adjacent which the flask is adapted to be moved, a movable car on which said platen is mounted and movable from a flask engaging position to a withdrawn position, valve controlled fluid pressure means for simultaneously moving said reciprocable members, latch means for preventing operation of said valve except when the car is in the flask engaging position, and means for automatically releasing said latch means when the car is moved into its flask engaging position.

6. In a molding machine, reciprocable members for supporting and moving a molding flask, a platen adjacent which the flask is adapted to be moved, a movable car on which said platen is mounted and movable from a flask engaging position to a withdrawn position, valve controlled fluid pressure means for simultaneously moving said reciprocable members, latch means for preventing operation of said valve except when the car is in the flask engaging position, and means carried by the car for automatically releasing said latch means when the car is moved into its flask engaging position.

7. In a molding machine having a frame and an upper supporting structure, primary rails within said supporting structure, a platen car, primary wheels on which said car is mounted engageable with said primary rails for propulsion of the car relative to said supporting structure from a withdrawn position to a projected operative position, and means for disengaging said primary wheels from said primary rails and for otherwise supporting the car within the supporting structure when the car is in its withdrawn position.

8. In a molding machine having a frame and an upper supporting structure, primary rails within said supporting structure, a platen car, primary wheels on which said car is mounted engageable with said primary rails for propulsion of the car relative to said supporting structure from a withdrawn position to a projected operative position, inclined stub rails within the supporting structure, and auxiliary wheels on said car engageable with said stub rails when the car is in its withdrawn position whereby the primary wheels are disengaged from the primary rails.

9. In a molding machine having a frame and an upper supporting structure, primary rails within said supporting structure, a platen car, primary wheels on which said car is mounted engageable with said primary wheels for propulsion of the car relative to said supporting structure from a withdrawn position to a projected operative position, inclined stub rails within the supporting structure, auxiliary wheels on said car engageable with said stub rails when the car is in its withdrawn position whereby the primary wheels are disengaged from the primary rails, and shock absorbers for cushioning the impact of the car when it reaches its withdrawn position.

10. In a molding machine having a frame and an upper supporting structure, primary rails within said supporting structure, a platen car, primary wheels on which said car is mounted engageable with said primary rails for propulsion of the car relative to said supporting structure from a withdrawn position to a projected operative position, upwardly, rearwardly inclined stub rails within the supporting structure, auxiliary wheels on said car engageable with said stub rails when the car is in its withdrawn position whereby the primary wheels are disengaged from the primary rails, shock absorbers for cushioning the impact of the car when it reaches its withdrawn position, and yielding means for releasably retaining said car on the inclined stub rails.

11. In a molding machine, reciprocable members for supporting and moving a molding flask, a platen supporting member relative to which the flask is adapted to be moved by said reciprocable members, means permitting movement of the platen supporting member from over the reciprocable members to a position laterally thereof, a pair of hooks movably and adjustably depended from said platen supporting member for releasably engaging a mold for removal of the mold from its support and for movement of the mold with the platen supporting member, and fluid actuated piston means for moving the engaging portions of said hooks toward and away from each other for mold engaging and mold releasing purposes.

12. In a molding machine, reciprocable members for supporting and moving a molding flask, a platen supporting member relative to which the flask is adapted to be moved by said reciprocable members, means permitting movement of the platen supporting member from over the reciprocable members to a withdrawn position laterally thereof, means depended from the platen supporting member for automatically, releasably engaging a mold when the platen supporting member is in its normal position, means controlled by downward movements of said reciprocable members for operating said mold engaging members, said means carrying the mold with it during lateral movement of the platen supporting member, and means controlled by movement of the platen supporting member to its withdrawn position for automatically effecting releasing operation of said mold engaging members.

13. In a molding machine, reciprocable members for supporting and moving a molding flask, a platen against which the flask is adapted to be moved for squeezing operations, a platen car supporting structure, a car on which said platen is mounted slidable in said structure and movable from a squeezing position over the flask to be withdrawn position, and yielding members against which supported portions of the car may bear during abnormal squeezing operations.

14. In a molding machine, reciprocable members for supporting and moving a molding flask, a platen against which the flask is adapted to be moved for squeezing operations, a platen car supporting structure, rails therewithin, a platen car slidable within said structure and having front wheels and rear wheels selectively engageable with said rails, bearing pads between portions of the supporting structure, the center of gravity of the car being forwardly of the axis of said front wheels, certain sections of said rails being yieldable, and means for causing a slight rearward tilting of said car when pressure is applied against the platen whereby the squeezing pressure is absorbed by some of said bearing pads and yieldable track sections and the front wheels of the car are relieved of its weight.

15. In a molding machine having jointly and severally reciprocable pistons and supporting members carried thereby for the performance of squeezing and pattern drawing operations, means for lowering said pistons and members from squeezing position, means for intercepting one of said supporting members during the lowering of the pistons for pattern drawing, and automatically operating regulatable valve controlled, fluid pressure means for retarding the speed of descent of said pistons at a selected point prior to the operation of said intercepting means and for accelerating the speed of descent of said pistons at a selected point after the pattern drawing is under way, said last-mentioned means including an eccentric surfaced finger adjustably depended from one of said supporting members and a valve plunger for the valve of the fluid pressure means formed with a head for engagement with eccentric surface portions of the finger during predetermined positions of said supporting member.

16. In a molding machine, reciprocable members for supporting and moving a molding flask, a movable platen adjacent which the flask is adapted to be moved when the platen is in a position over the flask, the platen being movable from said position to another position remote from the flask, valve controlled fluid pressure means for moving said reciprocable members, and means controlled by movement of the platen for preventing operation of said valve except when the platen is directly over the flesk.

17. In a molding machine, reciprocable members for supporting and moving a molding flask, a platen against which the flask is adapted to be moved for squeezing operations, a platen car supporting structure having guides therein, portions of said guides being yielding, a car on which said platen is mounted and having wheels engaging said guides, the car being movable from a withdrawn position to a squeezing position over the flask, some of the car wheels in the latter position engaging the yielding portions of said guides, and automatic means for preventing movement of said reciprocable members for squeezing operations except when said car is in the last-mentioned position.

18. In a molding machine having a frame and an upper supporting structure, primary rails within said supporting structure, a platen car, primary wheels on which said car is mounted engageable with said primary rails for propulsion of the car relative to said supporting structure from a withdrawn position to a projected operative position, means for disengaging said primary wheels from said primary rails and for otherwise supporting the car within the supporting structure when the car is in its withdrawn position, and retracted and latched cushioning members against which the car is engaged when in said withdrawn position, said car supporting means and said retracted cushioning members being effective to give the car an initial forward impetus upon release of the latch.

19. In a molding machine, reciprocable members for supporting and moving a molding flask, a platen supporting member relative to which the flask is adapted to be moved by said reciprocable members, means permitting movement of the platen supporting member from over the reciprocable members to a position laterally thereof, and means depended from said platen supporting member for releasably engaging a mold for removal of the mold from its support and for movement of the mold with the platen supporting member, said last-mentioned means being effective to raise and lower the mold.

ERLE J. BYERLEIN.
HARRISON E. FELLOWS.